(12) United States Patent
Lorita Rodriguez et al.

(10) Patent No.: US 12,037,134 B2
(45) Date of Patent: Jul. 16, 2024

(54) HELICOPTER HOISTING PLATFORM

(71) Applicant: General Electric Renovables Espana, S.L., Barcelona (ES)

(72) Inventors: Jesus Javier Lorita Rodriguez, Barcelona (ES); Jordi Fabrega Freixes, Barcelona (ES)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 17/870,266

(22) Filed: Jul. 21, 2022

(65) Prior Publication Data
US 2023/0030250 A1 Feb. 2, 2023

(30) Foreign Application Priority Data
Jul. 30, 2021 (EP) ..................................... 21382728

(51) Int. Cl.
*B64F 1/12* (2006.01)
*F03D 80/00* (2016.01)

(52) U.S. Cl.
CPC .............. *B64F 1/125* (2013.01); *F03D 80/00* (2016.05)

(58) Field of Classification Search
CPC .......... B64F 1/125; F03D 13/40; F03D 80/00; F05D 2240/14; F05D 2240/95
See application file for complete search history.

(56) References Cited

U.S. PATENT DOCUMENTS

| 7,837,443 | B2 * | 11/2010 | Mikkelsen | F03D 80/00 361/220 |
| 9,422,924 | B2 * | 8/2016 | Thiel | F03D 13/20 |
| 11,073,138 | B2 | 7/2021 | Munk-Hansen | |
| 2012/0282095 | A1 * | 11/2012 | Munk-Hansen | F03D 80/60 416/95 |
| 2019/0072084 | A1 * | 3/2019 | Munk-Hansen | F03D 1/00 |
| 2020/0002908 | A1 * | 1/2020 | Avner | F03D 80/50 |
| 2021/0098975 | A1 * | 4/2021 | Ball | B32B 15/043 |
| 2022/0042491 | A1 * | 2/2022 | Takayanagi | F03D 13/40 |

FOREIGN PATENT DOCUMENTS

| EP | 2588754 B1 | 10/2017 |
| KR | 20120125198 A | 11/2012 |
| KR | 20190131867 A | * 11/2019 |

OTHER PUBLICATIONS

KR-20190131867-A (Kim, Sudong) (Nov. 27, 2019), English Translation (Year: 2023).*
European Search Report Corresponding to EP21382728 on Jan. 18, 2022.
Henshaw, Controlling Electrical Hazards, OSHA 3075, US Department of Labor—Occupational Safety and Health Administration (OSHA), 2002, 71 Pages. https://www.osha.gov/osha3075.pdf.
Voigtsberger, Small Contact Voltage Exposures Not Lethal to Human, EC&M Safety Shock Electrocution, Sep. 20, 2012, 8 Pages. https://www.ecmweb.com/shock-amp-electrocution/small-contact-voltage-exposures-not-lethal-human.

* cited by examiner

*Primary Examiner* — David E Sosnowski
*Assistant Examiner* — Aye S Htay
(74) *Attorney, Agent, or Firm* — Dority & Manning, P.A.

(57) ABSTRACT

The present invention discloses a helicopter hoisting platform for a wind turbine nacelle cover, the helicopter hoisting platform comprising a composite layer and a plurality of metal plates arranged on the outer surface of the composite layer, wherein the plurality of metal plates forms a conductive network electrically connected to a ground connection.

13 Claims, 6 Drawing Sheets

HELICOPTER HOISTING PLATFORM

FIELD

The present disclosure relates to wind turbines, and more particularly relates to a helicopter hoisting platform of a wind turbine. The present disclosure further relates to a nacelle cover assembly comprising a helicopter hoisting platform and methods for providing a nacelle cover assembly.

BACKGROUND

Wind turbines are broadly used to convert the wind power into electricity. The generated electricity can be supplied to an electrical grid and directed to electrical customers. Wind turbines generally comprise a tower on top of which a nacelle is mounted. A rotor comprising a rotor hub and a plurality of blades are generally mounted in said nacelle, defining a rotatable coupling between rotor and nacelle. The plurality of blades use the wind generated aerodynamic forces to produce a net positive torque on a rotating shaft, resulting in the production of mechanical power, which is later transformed to electricity in a generator generally housed in a wind turbine nacelle.

Wind turbines have evolved rapidly over the last decades and wind turbines components have been modified to withstand higher loads and adverse weather conditions. Wind turbine nacelles house the drive train and other uptower components and protect them against external hazards like precipitation, dust, UV radiation and lightning strikes. Further, wind turbine nacelles generally provide an inlet and outlet for airflow within the generator; and withstand wind forces experienced by the blades, heat produced by the drive train and provide a working platform for qualified personnel. The nacelle generally sits on top of a yaw bearing that allows rotating the nacelle to maintain the rotor aligned with the wind direction.

Due to the global growth of offshore wind energy, helicopters are becoming one of the most convenient forms of transport to reach wind turbines, and more precisely wind turbine nacelles. Large distances from land to offshore sites results in helicopters as a very reliable, cost-effective and safe solution for transportation, rescue and maintenance operations. Further, using helicopters to reach offshore wind turbines might result in significant saving when the sea is rough. While offshore wind turbines might be inaccessible by a vessel, a helicopter can perform all necessary transportation, avoiding loss of revenue.

Generally, as helicopters are unable to land on a wind turbine nacelle, wind turbines nacelles are commonly equipped with a helicopter hoisting platform to facilitate the loading and unloading of personnel and/or goods. Thus, the helicopter may hover over the helicopter hoisting platform while they hoist or lower, personnel or loads by means of a hoist cable.

In these situations, the helicopter may build up electrical charge; and therefore, before any person makes contact between the helicopter and the wind turbine, the static electricity of the helicopter should be safely discharged. To do so, the helicopter hoisting platform may comprise an electrically conducting material that is grounded via a support structure such as the nacelle bedframe or any other structure that is also part of an electrical path to ground. Thus, the helicopter crew can connect a conductive wire to the hoist hook; the conductive wire being long enough to reach the electrically conductive material on the helicopter hoisting platform and discharge static electricity before personnel on the wind turbine grasp the hook, or personnel on the helicopter touch the ground. To discharge static electricity to a safe level, it is further recommended to reduce the resistance of the electrical circuit from the static discharge wire contact point to ground, for example below 15 kOhms.

Known approaches to include an electrically conductive material on the helicopter hoisting platform include applying a conductive cladding or paint over the outer surface of the platform or to provide conductive components on top of the helicopter hoisting platform connected to ground. However, prior art approaches present some drawbacks that can compromise the success of the helicopter electrical discharge operation.

On the one hand, approaches involving a surface treatment and or surface cover such as conductive paint or cladding are limited in terms of electric resistance range, providing in most cases high resistance, and therefore hindering the helicopter electric discharge. Further, surface treatments might suffer scratches and other superficial deterioration, leading to a non-continuous conductive media, creating non-conductive isolated patches. This may imply that the conductive wire coming from the helicopter can contact the helicopter hoisting platform in a point which might not be electrically coupled to ground, and therefore a proper discharge does not take place. Besides, conductive surface treatments might not provide a surface finish with sufficient grip for personnel to work safely during humid weather conditions. Offshore wind turbines inherently operate in a very high humid environment and therefore a non-slip surface finish is of may be important during hoisting operations.

On the other hand, approaches involving the arrangement of conductive plates or strips on top of a helicopter hoisting platform result in an uneven surface finish representing a potential trip hazard.

The present disclosure provides methods and systems to at least partially overcome some of the aforementioned drawbacks.

SUMMARY

In an aspect of the present disclosure, a helicopter hoisting platform for a wind turbine nacelle cover is provided. The helicopter hoisting platform comprises a composite layer including at least an outer surface and an inner surface. It further comprises a plurality of metal plates arranged on the outer surface of the composite layer and spaced from each other. The plurality of metal plates form a conductive network that is electrically connected to a ground connection located below the composite layer.

According to this aspect, the fact that the helicopter hoisting platform comprises a plurality of metal plates arranged on the outer surface of the composite layer and spaced from each other results in a platform providing a safe and robust connection to ground for the helicopter to discharge static electricity. Further, the helicopter hoisting platform provides a reliable electric connection to ground for helicopter static electricity discharge. The plurality of metal plates can be arranged at different spacings to reduce the chances of the conductive wire not to contact the conductive network to ground. Further, the existence of a plurality of individual metal plates facilitates the replacement of them if required, with very little cost and in a fast and effective manner.

Furthermore, according to this aspect the helicopter hoisting platform can be directly assembled to existing nacelle covers, upgrading the connection to ground and improving robustness of the same.

In an additional aspect, a method for providing a nacelle cover assembly is provided. The method comprises providing a nacelle cover assembly comprising a composite layer including at least an outer surface and an inner surface, wherein the outer surface includes one or more openings. The method further comprises providing a plurality of metal plates on the outer surface of the composite layer and providing a ground connection inside the nacelle cover assembly and connecting the ground connection to at least one of the metal plates. The method further comprises providing a conductive network between the plurality of metal plates electrically connected to the ground connection.

Additional objects, advantages and features of embodiments of the disclosure will become apparent to those skilled in the art upon examination of the description, or may be learned by practice.

Throughout the present disclosure, and with respect to the various examples disclosed herein, it should be noted that that the term metal plate is used to refer to a conductive element having a relatively small thickness in relation to its length and width; and more specifically to a conductive element that may have a much greater length than width. Further, the term conductive network in relation to the metal plates means that the metal plates are interconnected to each other in such a way that any point of the plurality of metals plates defines an electrically conductive path to ground.

DETAILED DESCRIPTION OF EXAMPLES

Figure 1:
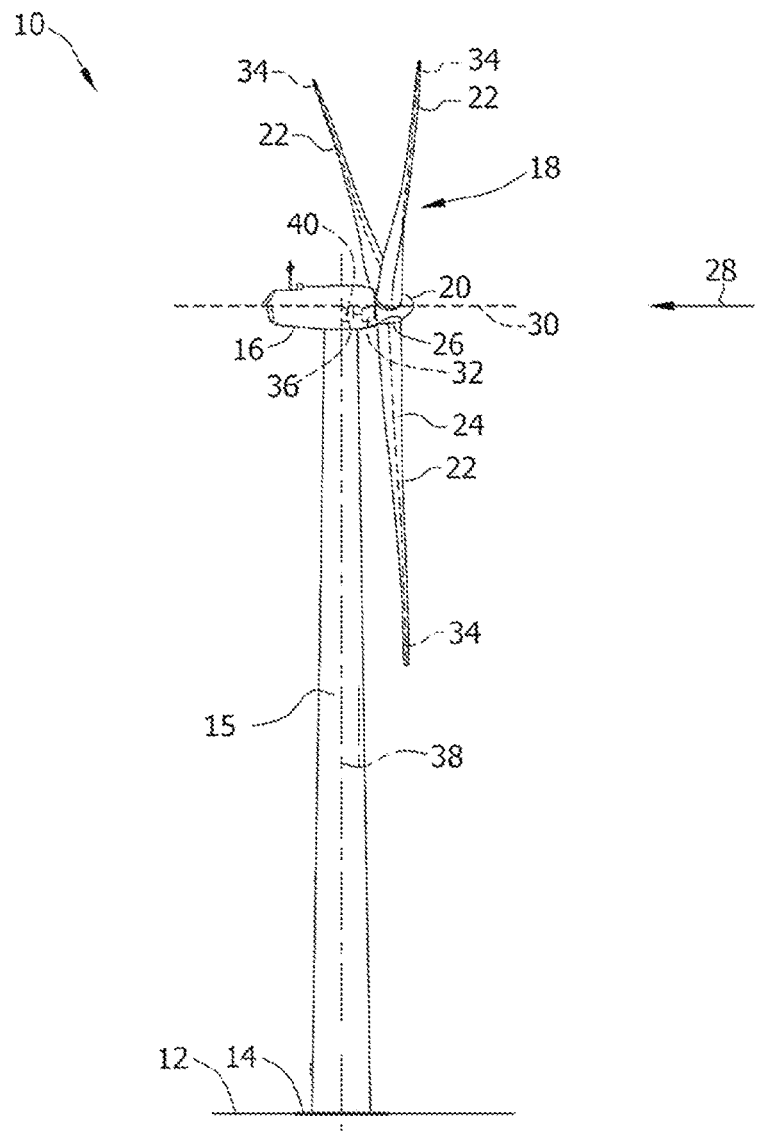
FIG. 1 schematically illustrates a perspective view of one example of a wind turbine.

Reference now will be made in detail to embodiments of the disclosure, one or more examples of which are illustrated in the drawings. Each example is provided by way of explanation of the disclosure, not as a limitation thereof. In fact, it will be apparent to those skilled in the art that various modifications and variations can be made in the present disclosure without departing from the spirit or scope of its teaching. For instance, features illustrated or described as part of one embodiment can be used with another embodiment to yield a still further embodiment. Thus, it is intended that the present disclosure covers such modifications and variations as come within the scope of the appended claims and their equivalents.

FIG. 1 is a perspective view of an example of a wind turbine 10. In the example, the wind turbine 10 is a horizontal-axis wind turbine. Alternatively, the wind turbine 10 may be a vertical-axis wind turbine. In the example, the wind turbine 10 includes a tower 15 that extends from a support system 14 on a ground 12, a nacelle 16 mounted on tower 15, and a rotor 18 that is coupled to nacelle 16. The rotor 18 includes a rotatable hub 20 and at least one rotor blade 22 coupled to and extending outward from the hub 20. In the example, the rotor 18 has three rotor blades 22. In an alternative embodiment, the rotor 18 includes more or less than three rotor blades 22. The tower 15 may be fabricated from tubular steel to define a cavity (not shown in FIG. 1) between a support system 14 and the nacelle 16. In an alternative embodiment, the tower 15 is any suitable type of a tower having any suitable height. According to an alternative, the tower can be a hybrid tower comprising a portion made of concrete and a tubular steel portion. Also, the tower can be a partial or full lattice tower.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root portion 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In examples, the rotor blades 22 may have a length ranging from about 15 meters (m) to about 90 m or more. Rotor blades 22 may have any suitable length that enables the wind turbine 10 to function as described herein. For example, non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about a rotor axis 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, i.e., an angle that determines an orientation of the rotor blades 22 with respect to the wind direction, may be changed by a pitch system 32 to control the load and power generated by the wind turbine 10 by adjusting an angular position of at least one rotor blade 22 relative to wind vectors. Pitch axes 34 of rotor blades 22 are shown. During operation of the wind turbine 10, the pitch system 32 may particularly change a pitch angle of the rotor blades 22 such that the angle of attack of (portions of) the rotor blades are reduced, which facilitates reducing a rotational speed and/or facilitates a stall of the rotor 18.

In the example, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the example, as the wind direction 28 changes, a yaw direction of the nacelle 16 may be rotated about a yaw axis 38 to position the rotor blades 22 with respect to wind direction 28.

In the example, the wind turbine controller 36 is shown as being centralized within the nacelle 16, however, the wind turbine controller 36 may be a distributed system throughout the wind turbine 10, on the support system 14, within a wind farm, and/or at a remote-control center. The wind turbine controller 36 includes a processor 40 configured to perform the methods and/or steps described herein. Further, many of the other components described herein include a processor.

As used herein, the term "processor" is not limited to integrated circuits referred to in the art as a computer, but broadly refers to a controller, a microcontroller, a microcomputer, a programmable logic controller (PLC), an application specific, integrated circuit, and other programmable circuits, and these terms are used interchangeably herein. It should be understood that a processor and/or a control system can also include memory, input channels, and/or output channels.

Figure 2:
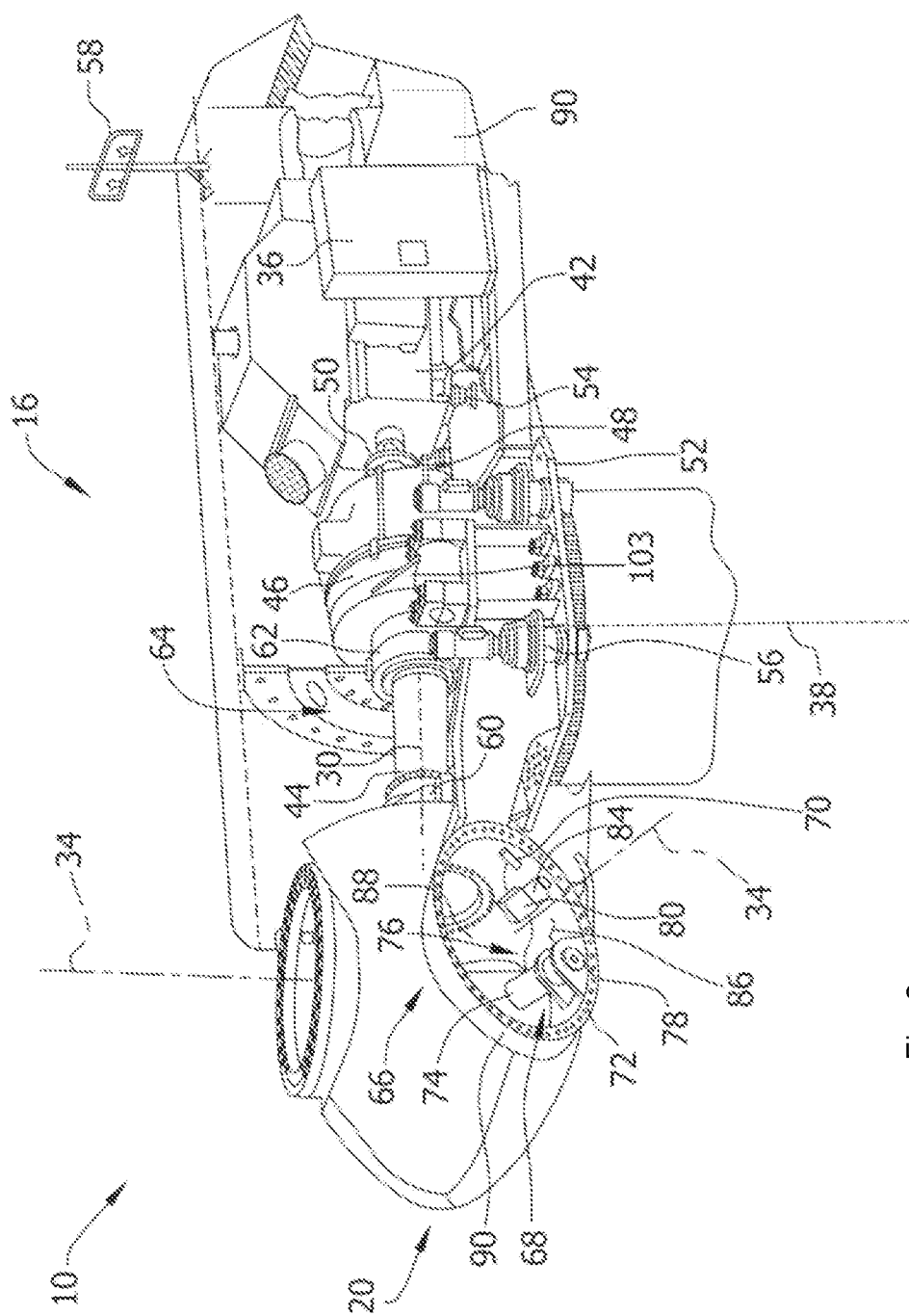
FIG. 2 illustrates an example of a hub and a nacelle of a wind turbine.

FIG. 2 is an enlarged sectional view of a portion of the wind turbine 10. In the example, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high-speed shaft 48, and a coupling 50. In the example, the main shaft 44 is disposed at least partially coaxial to a longitudinal axis (not shown) of the nacelle 16. A rotation of the main shaft 44 drives the gearbox 46 that subsequently drives the high-speed shaft 48 by translating the relatively slow rotational movement of the rotor 18 and of the main shaft 44 into a relatively fast rotational movement of the high-speed shaft 48. The latter is connected to the generator 42 for generating electrical energy with the help of a coupling 50. Furthermore, a transformer 90 and/or suitable electronics, switches, and/or inverters may be arranged in the nacelle 16 in order to transform electrical energy generated by the generator 42 having a voltage between 400V to 1000 V into electrical energy having medium voltage (10-35 KV). Said electrical energy is conducted via power cables from the nacelle 16 into the tower 15.

The gearbox 46, generator 42 and transformer 90 may be supported by a main support structure frame of the nacelle 16, optionally embodied as a main frame 52. The gearbox 46 may include a gearbox housing that is connected to the main frame 52 by one or more torque arms 103. In the example, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Optionally, the main frame 52 is configured to carry the entire load caused by the weight of the rotor 18 and components of the nacelle 16 and by the wind and rotational loads, and furthermore, to introduce these loads into the tower 15 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

In some examples, the wind turbine may be a direct drive wind turbine without gearbox 46. Generator 42 operate at the same rotational speed as the rotor 18 in direct drive wind turbines. They therefore generally have a much larger diameter than generators used in wind turbines having a gearbox 46 for providing a similar amount of power than a wind turbine with a gearbox.

The nacelle 16 also may include a yaw drive mechanism 56 that may be used to rotate the nacelle 16 and thereby also the rotor 18 about the yaw axis 38 to control the perspective of the rotor blades 22 with respect to the wind direction 28.

For positioning the nacelle 16 appropriately with respect to the wind direction 28, the nacelle 16 may also include at least one meteorological measurement system 58 which may include a wind vane and anemometer. The meteorological measurement system 58 can provide information to the wind turbine controller 36 that may include wind direction 28 and/or wind speed. In the example, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angle of a rotor blade 22 along the pitch axis 34. Only one of three pitch drive systems 68 is shown in FIG. 2.

In the example, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the example, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servomechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 may also include one or more pitch control systems 80 for controlling the pitch drive system 68 according to control signals from the wind turbine controller 36, in case of specific prioritized situations and/or during rotor 18 overspeed. In the example, the pitch assembly 66 includes at least one pitch control system 80 communicatively coupled to a respective pitch drive system 68 for controlling pitch drive system 68 independently from the wind turbine controller 36. In the example, the pitch control system 80 is coupled to the pitch drive system 68 and to a sensor 70. During normal operation of the wind turbine 10, the wind turbine controller 36 may control the pitch drive system 68 to adjust a pitch angle of rotor blades 22.

According to an embodiment, a power generator 84, for example comprising a battery and electric capacitors, is arranged at or within the hub 20 and is coupled to the sensor 70, the pitch control system 80, and to the pitch drive system 68 to provide a source of power to these components. In the example, the power generator 84 provides a continuing source of power to the pitch assembly 66 during operation of the wind turbine 10. In an alternative embodiment, power generator 84 provides power to the pitch assembly 66 only during an electrical power loss event of the wind turbine 10. The electrical power loss event may include power grid loss or dip, malfunctioning of an electrical system of the wind turbine 10, and/or failure of the wind turbine controller 36. During the electrical power loss event, the power generator 84 operates to provide electrical power to the pitch assembly 66 such that pitch assembly 66 can operate during the electrical power loss event.

In the example, the pitch drive system 68, the sensor 70, the pitch control system 80, cables, and the power generator 84 are each positioned in a cavity 86 defined by an inner surface 88 of hub 20. In an alternative embodiment, said components are positioned with respect to an outer surface of hub 20 and may be coupled, directly or indirectly, to the outer surface.

Figure 3:
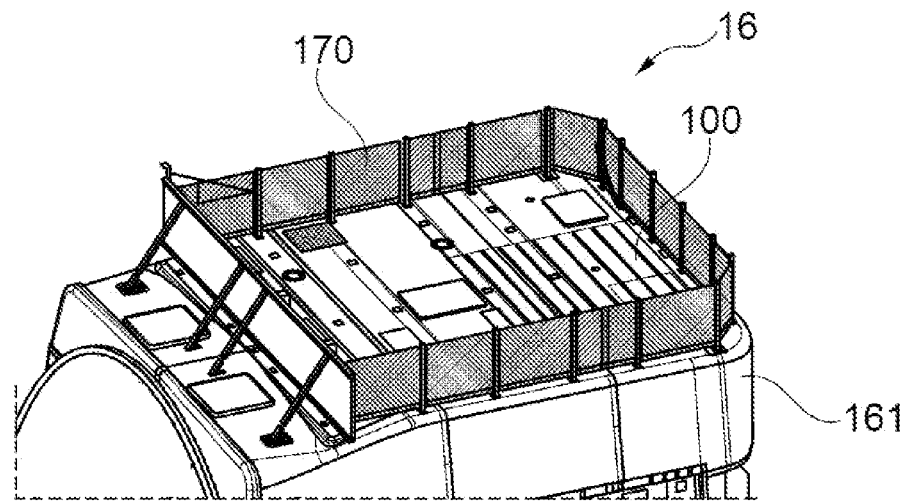
FIG. 3 schematically illustrates a perspective view of a wind turbine nacelle comprising one example of a helicopter hoisting platform.
Figure 4:
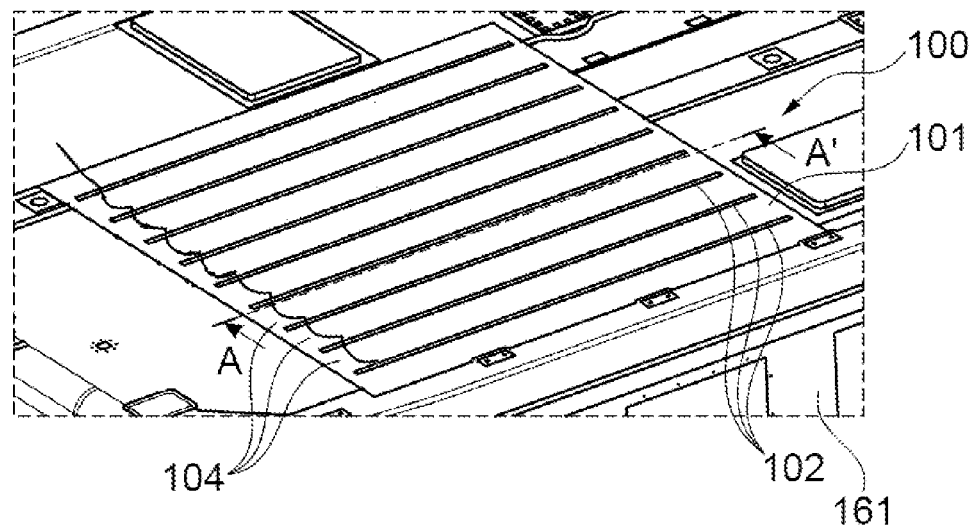
FIG. 4 schematically illustrates a perspective top view of another example of a helicopter hoisting platform.

FIG. 3 is a schematic perspective view of a nacelle 16 for a wind turbine. FIG. 4 illustrates in more detail the helicopter hoisting platform 100 shown in FIG. 3 for a wind turbine nacelle 161. The nacelle 16 comprises a roof comprising a composite layer 101. The composite layer 101 includes at least an outer surface at an outside of the nacelle 16 and an inner surface at an inside of the nacelle 16. Further, the nacelle 16 includes a plurality of metal strips 102 arranged on the outer surface of the composite layer 101 and spaced from each other. At least some of the metal strips 102 are electrically connected to each other at an inside of the nacelle 16, and at least one ground connection is connected to one of the metal strips 102.

FIG. 3 shows a nacelle cover assembly 161 comprising a helicopter hoisting platform 100. As can be seen in the example of FIG. 3, the nacelle 16 may also comprise other components such as, for example, handrails 170 which define a safe pedestrian area. Note that in the present example the helicopter hoisting platform 100 is integrated in the nacelle cover outer surface. However, other configurations in which the helicopter hoisting platform 100 is formed as an elevated dedicated platform elevated or as a platform apart from the nacelle cover assembly 161 are also possible.

As mentioned before, the helicopter hoisting platform 100 comprises a composite layer 101 including at least an outer surface and an inner surface, and a plurality of metal plates 102 arranged on the outer surface of the composite layer 101 and spaced from each other. The plurality of metal plates 102 form a conductive network electrically connected to a ground connection located below the composite layer. This conductive network may be formed by the interconnection of the plurality of metal plates by means of a conductive plate or cable. This means that a contact between a helicopter conductive wire and any of the plurality of metal plates would discharge the static electricity from the helicopter to ground.

In some examples, like in FIG. 4, a plurality of non-slip surfaces may be arranged between the metal conductive plates. Such non-slip surfaces can provide a secure pedestrian area for the personnel performing maintenance operations and loading/unloading operations.

In some examples, the ground connection may extend through the composite layer, i.e. the ground connection may extend from the inner surface to the outer surface of the composite layer where it is electrically connected to one or more of the metal plates 102.

The metal plates 102 may be elongated metal strips.

Further, FIG. 4 shows an example of an arrangement of the plurality of metal plates 102, wherein the metal plates 102 are substantially parallel to each other. More precisely, the plurality of metal plates 102 may be parallel and placed at a constant distance from each other. This distance may leave a free clearance between metal plates. In examples, the metal plates may be arranged with a clearance (free space between edges of metal plates) of between 25-60 centimetres between each other. A larger distance between metal plates may lead to the need of manoeuvring the helicopter or the wire so that the conductive wire contacts any of the plurality of metal plates, whereas a shorter distance may reduce the visibility of the helicopter hoisting platform to some extent. Such a platform needs to be readily identifiable and is therefore usually painted in yellow.

In examples with non-slip surfaces, a relatively high ratio of metal plate surface to non-slip surface can increase the slip hazard. The range of 25-60 cm allows sufficient space between metal plates 102 for the personnel to at least partially step on the adjacent non-slip surfaces for a better grip whereas, at the same time, it provides several contact areas distributed on the helicopter hoisting platform 100 to ensure the helicopter discharge wire can make contact with at least one of them prior to the hoisting operation.

The metal plates may have a thickness in the range of 1.5 to 5 mm, and may have a width in the range of 3 to 8 cm. A suitable width may be chosen taken into account particularly the requirements of reducing the risk of slipping provided by non-slip surfaces adjacent to the metal plates. Other arrangements of the metal plates forming the helicopter hoisting platform 100 are also possible, such as for example forming a cartesian grid or a grid with non-straight angles between metal plates.

Figure 5:
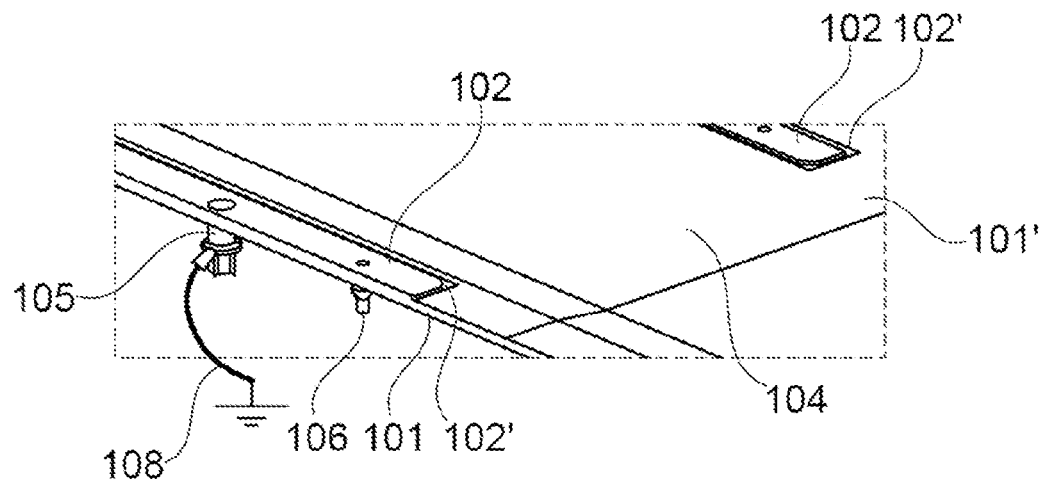
FIG. 5 schematically illustrates a detail perspective top view of the nacelle cover helicopter hoisting platform including a longitudinal cut through the plane A-A' of FIG. 4.

FIG. 5 shows a detailed view of a helicopter hoisting platform including a longitudinal cut through the plane A-A' of FIG. 4. As shown in the figure, the metal plates 102 may be located in recesses 102' formed in the outer surface 101' of the composite layer 101. These recesses 102' allow the integration of the metal plates 102 in the outer surface 101'. This means that the metal plates 102 may become substantially flush with the adjacent surfaces or in any case that the difference in height with adjacent surfaces is reduced. In the present example, the recesses 102' are formed between the adjacent non-slip surfaces 104. The recesses 102' may be shaped and sized such that the metal plates fit in them substantially exactly.

In the present example, at least one of the plurality of non-slip surfaces 104 is a sand painted surface. Thus, the texture of the sand is integrated into the paint, and the painted surface acquires the surface roughness provided by the sand. Different types of sand may be used to provide a surface with a range of roughness profiles and other aggregates such as quartz, silica or aluminium oxide can be also added to the paint to enhance grip. Since surface friction increases as surface roughness increases, a relatively rough surface provides an enhanced grip for personnel to walk safely over the platform under wet and dry atmospheric conditions. Therefore, other non-slip surfaces such as knobbed, ribbed or corrugated top surfaces can be used for the same purpose.

In further examples, non-slip surfaces may also extend beyond the helicopter hoisting platform over the whole or a significant part of the roof of the nacelle.

Further, in the present example, the height (or thickness) of the non-slip surfaces 104 and the height (or thickness) of the metal plates 102 may be chosen such that a relative difference in height between an average height of the non-slip surface and an outer surface of the plurality of metal plates may be below 4 mm, specifically below 3 mm, and more specifically 1.5 mm. A reduced height difference between metal plates 102 and non-slip surfaces 104 results in a more homogeneous surface and mitigates the risk of persons tripping and other related hazards for the personnel working on the vicinity of the helicopter hoisting platform.

The longitudinal cut in FIG. 4 shows that at least one of the plurality of metal plates comprises at least one inward protruding element 105. In the example shown, the metal plate 102 comprises two inward protruding elements 105, 106 that will be explained below. Further, the example of FIG. 4 illustrates that the composite layer 101 comprises at least one opening to receive the at least one inward protruding element 105, 106 of the metal plate 102, the metal plate protruding element 105, 106 projecting from the inner surface of the composite layer 101. The protruding elements may be welded, pressure fitted, threaded or joint in a suitable manner to one or more of the metal plates. This will become more evident in the example shown in FIG. 6.

Figure 6:
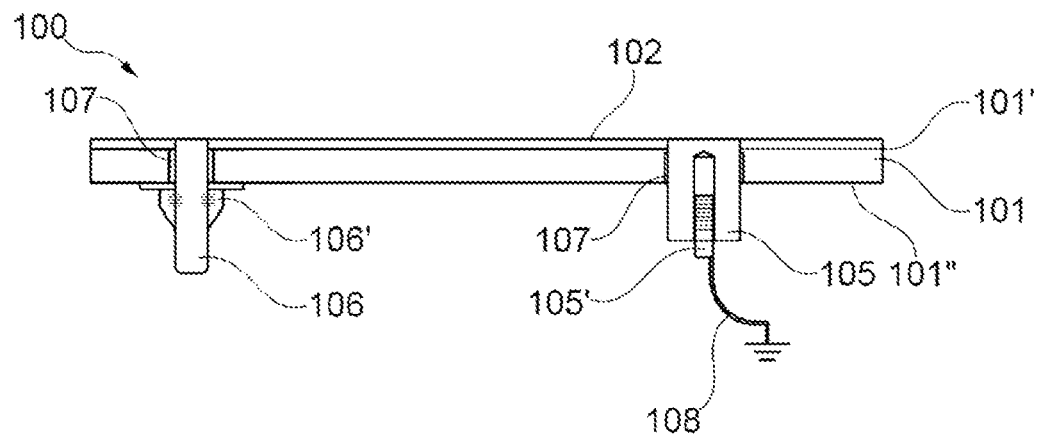
FIG. 6 schematically illustrates a cross-section of another example of helicopter hoisting platform.

FIG. 6 shows a cross-section view of a helicopter hoisting platform 100, wherein a metal plate 102 is located on top of a composite layer 101 including an outer surface 101' and an inner surface 101". The metal plate 102 of the present example comprises two inward protruding elements 105, 106. The inwardly protruding elements 105, 106 may be integrally formed with metal plate 102, or may be attached to the metal plate.

A first inward protruding element 105 is a conductive protruding element for receiving a ground connection 108, whereas the second inward protruding element 106 comprises a fastener 106' to secure the metal plate 102 to the composite layer 101. In the present example, the fastener 106' is a threaded nut that matches a thread of the second inward protruding element, but other alternatives are also possible. The first inward protruding element 105 may comprise a female connector for receiving a male connector 105' to ground 108 or it may comprise a male connector for receiving a female connector to ground 108. Besides, the connection between said female-male connectors may be a threaded connection or a fast connection as for example a push fit connection. Thus, the composite layer 101 may comprise as many openings 107 as there are connectors or inward protruding elements 105, 106. Examples wherein only a first inward protruding element 105 is included are also possible.

In other examples, the metal plate 102 may be alternatively or additionally fixed to the composite layer by means of an adhesive material, as for example epoxy. This may allow efficiently and effectively sealing the openings 107 in the composite layer 101 and avoid any leakage to the interior of the nacelle 16.

Figure 7:
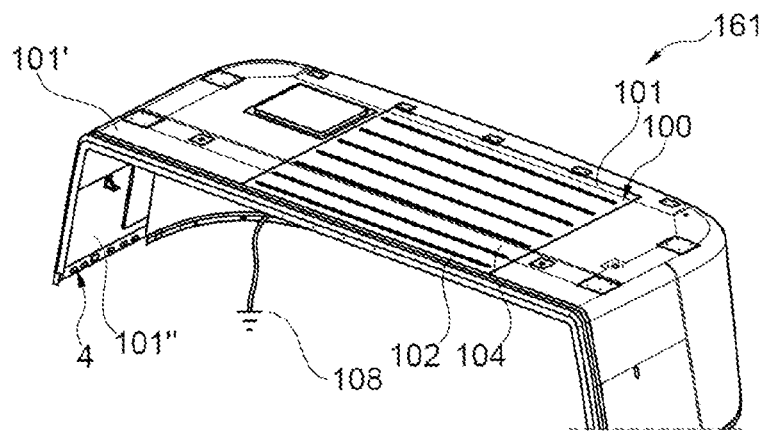
FIG. 7 schematically illustrates a perspective view of a nacelle cover assembly comprising a helicopter hoisting platform.
Figure 8:
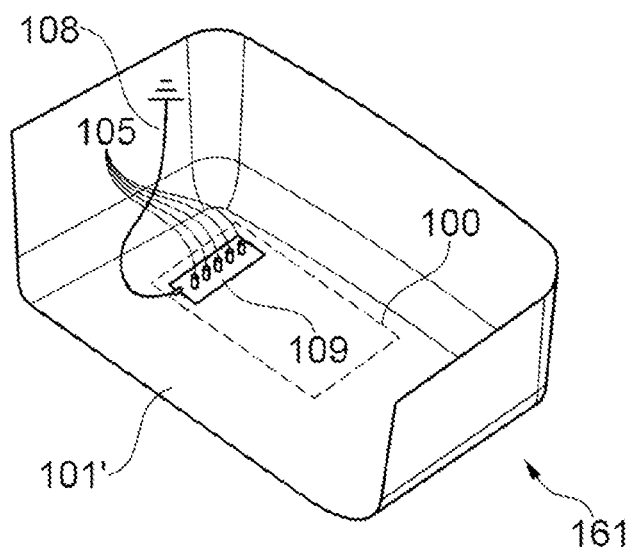
FIG. 8 shows a flowchart of an example of a method for providing a nacelle assembly.

FIGS. 7 and 8 show a perspective top and bottom view of a nacelle cover assembly 161, respectively; wherein the nacelle cover assembly 161 comprises a helicopter hoisting platform 100. The nacelle cover assembly 161 defines a helicopter hoisting platform 100 and comprises a composite layer 101 including at least an outer surface 101' and an inner surface 101", a plurality of metal plates 102 arranged on the outer surface 101' of the composite layer 101 and spaced from each other; and a plurality of non-slip surfaces 104 arranged between the metal plates 102, and at least one ground connection 108. Thus, the outer surface 101' of the composite layer 101 defines a helicopter hoisting platform 100 including the plurality of metal plates 102 and the plurality of non-slip surfaces 104 interposed between the plurality of metal plates 102. The plurality of metal plates 102 forms a conductive network electrically connected to the at least one ground connection 108 located below the inner surface of the composite layer 101.

In the example shown in FIGS. 7 and 8 the composite layer 101 may include glass fiber and/or polyester resin. The composite layer 101 may additionally or alternatively include other fibers and resins such as carbon, basalt, or aramid fiber, as well as epoxy or vinylesther resin among others. Although it is not illustrated in FIGS. 7 and 8, the nacelle cover may lie on top of an internal nacelle frame, to provide rigidity and to withstand external forces acting on the nacelle cover.

As previously disclosed in relation to the helicopter hoisting platform 100, in other examples, the nacelle cover assembly 161 may include non-slip surfaces 104 which are sand painted; wherein the non-slip surfaces 104 form recesses 102' to receive the plurality of metal plates 102; and wherein a relative height between an average height of the non-slip surface 104 and an outer surface of the plurality of metal plates 102 is below 4 mm, and specifically below 3 mm.

As is illustrated in FIG. 8, the helicopter hoisting platform 100 (shown with dotted lines), may further comprise a conductive connection assembly comprising one or more conductive elements 109 located below the inner surface 101" of the compositive layer 101 for electrically connecting the plurality of metal plates 102. The conductive connection element illustrated in this example is a metal plate or metal bar, but other conductive connection elements such as wires or cables are also valid.

Further, FIG. 8 shows that the ground connection 108 might be alternatively coupled to the conductive connection element 109, which, at the same time, is electrically coupled with all metal plates 102. The conductive connection assembly may connect the plurality of metal plates in series or in parallel.

Figure 9:
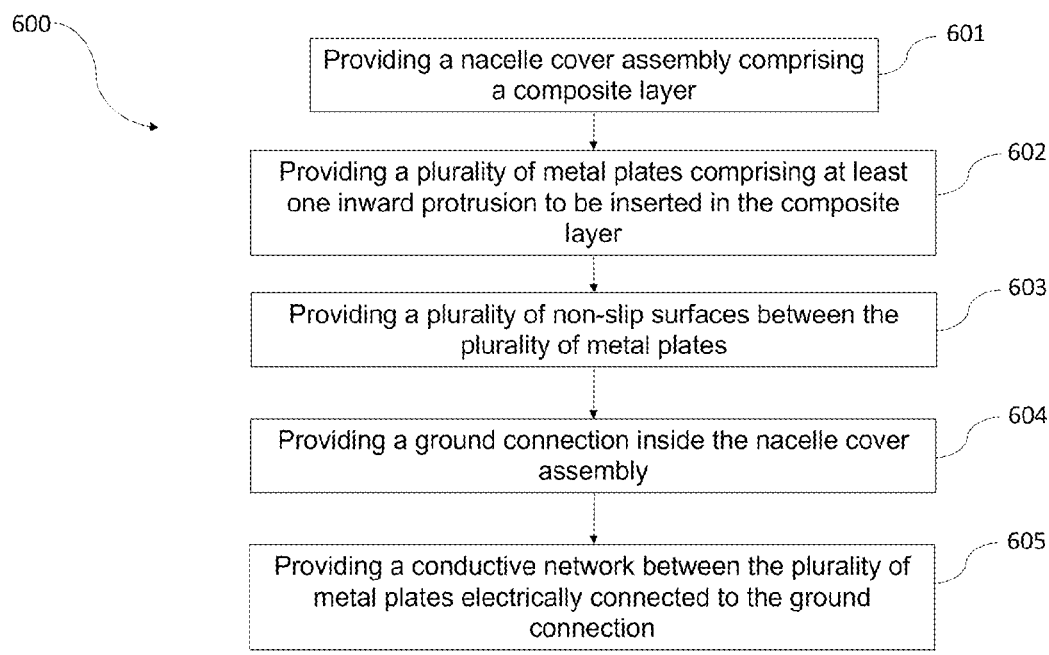
FIG. 9 is a flowchart of a method embodiment for providing a nacelle assembly.

In another aspect of the disclosure, a method 600 is provided. Method 600 is suitable for providing a nacelle assembly 161. Method 600 is schematically illustrated in FIG. 9.

The method comprises, at block 601, providing a nacelle cover assembly 161 comprising a composite layer 101 including at least an outer surface 101' and an inner surface 101", wherein the outer surface 101' includes one or more openings 107. The method 600 also comprises, at block 602, providing a plurality of metal plates 102 on the outer surface 101' of the composite layer 101.

Further, the method 600 comprises providing a ground connection 108 inside the nacelle cover assembly and connecting it to at least one of the metal plates. Additionally, the method 600 may also comprise providing a conductive network between the plurality of metal plates 102 which are electrically connected to the ground connection 108. This defines an electric path from any of the electrically connected metal plates 102 to ground, which is configured to discharge or evacuate the built-up static electricity of the helicopter upon conductive wire contact.

In some examples, at least one of the metal plates 102 may comprise at least one inward protruding element 105, 106 to be inserted in the composite layer opening 107. The method 600, at block 603, may further comprise providing a plurality of non-slip surfaces 104 on the outer surface 101' in the spacing between the plurality of metal plates 102. This step, independently of the order followed, allows to reduce the relative height or thickness between the outer surface of the metal plates 102 and the non-slip surface, reducing trip hazards for personnel.

In examples, the method 600 for providing a nacelle assembly 161 may comprise providing the plurality of metal plates 102 substantially parallel to each other. Further, in other examples, the method 600 may further comprise providing a metal plate 102 wherein at least one inward protruding element 105, 106 of a metal plate is a threaded rod, and the method 600 further comprises fastening the at least one metal plate 102 to the composite layer 101 through a fastening element with matching thread to the threaded rod. Alternatively or additionally, the fastening of the metal plate 102 to the composite layer 101 can be performed by applying an adhesive element such as epoxy.

In further examples, the method 600 may also comprise providing a conductive element 109 located in the inner surface 101" of the composite layer 101 for metal plate interconnection.

Furthermore, the method 600 may also comprise providing non-slip surfaces 104 which are sand painted, and in other examples the metal plates 102 have a thickness and the sand painted surfaces 104 have a mean average thickness such that a change in relative height between them is below 3 mm.

In even further examples, the method 600 may comprise providing a nacelle assembly according to any of the technical features previously presented.

This written description uses examples to disclose the teaching, including the preferred embodiments, and also to enable any person skilled in the art to practice the teaching, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A helicopter hoisting platform for a wind turbine nacelle cover, wherein the nacelle cover defines a roof of a nacelle defined between a front end and a rear end of the nacelle, comprising:
   a composite layer including an exposed upper outer surface and an inner surface, the composite layer configured for integration into the nacelle cover without extending beyond the front end and the rear end of the nacelle or to vertically align and overlie the nacelle cover without extending beyond the front end and the rear end of the nacelle;
   a plurality of metal plates arranged on the exposed upper outer surface of the composite layer and spaced from each other;
   wherein the plurality of metal plates are electrically interconnected to form an exposed conductive network atop of the exposed upper outer surface of the composite layer that is electrically connected to a ground connection located below the composite layer;
   the plurality of metal plates comprising a plurality of metal strips spaced apart on the exposed upper outer surface of the composite layer to define a pedestrian work area with sections of the exposed upper outer surface of the composite layer alternating with the metal strips, the alternating sections of the exposed upper outer surface comprising a free space between each of the metal strips, wherein each of the free spaces is between 25-60 cm; and
   each of the free spaces between the metal strips painted to render the platform identifiable to an approaching helicopter.

2. The helicopter hoisting platform of claim 1, wherein each of the free spaces between the metal strips is treated to be a non-slip surface.

3. The helicopter hoisting platform of claim 2, wherein the non-slip surface comprises a sand painted surface.

4. The helicopter hoisting platform of claim 2, wherein a relative difference in height between the non-slip surface and an outer surface of the plurality of metal strips is 4 mm or less.

5. The helicopter hoisting platform of claim 1, wherein the plurality of metal strips are arranged substantially parallel to each other.

6. The helicopter hoisting platform of claim 2, wherein the plurality of metal strips are located in recesses formed in the exposed upper outer surface of the composite layer.

7. The helicopter hoisting platform of claim 1, wherein the ground connection extends through the composite layer.

8. The helicopter hoisting platform of claim 1, wherein at least one of the plurality of metal plates comprises an inward protruding element and the composite layer thereof comprises an opening to receive the inward protruding element.

9. The helicopter hoisting platform of claim 8, wherein the inward protruding element is a conductive protruding element that receives the ground connection.

10. The helicopter hoisting platform of claim 1, further comprising a conductive connection assembly located below the inner surface of the composite layer for electrically connecting the plurality of metal plates.

11. The helicopter hoisting platform of claim 10, wherein the conductive connection assembly comprises one or more conductive plates or conductive cables.

12. A nacelle of a wind turbine, comprising the helicopter hoisting platform according to claim 11.

13. A wind turbine, comprising a nacelle, the nacelle comprising the helicopter hoisting platform according to claim 12.

* * * * *